(No Model.)

L. HUSSEY.
NUT LOCK.

No. 369,007. Patented Aug. 30, 1887.

Witnesses
Henry G. Dieterich
E. G. Siggers

Inventor
Lutellus Hussey
By his Attorneys
C. A. Snow & Co.

UNITED STATES PATENT OFFICE.

LUTELLUS HUSSEY, OF LOCKLAND, OHIO.

NUT-LOCK.

SPECIFICATION forming part of Letters Patent No. 369,007, dated August 30, 1887.

Application filed January 29, 1887. Serial No. 225,906. (No model.)

*To all whom it may concern:*

Be it known that I, LUTELLUS HUSSEY, a citizen of the United States, residing at Lockland, in the county of Hamilton and State of Ohio, have invented a new and useful Improvement in Nut-Locks, of which the following is a specification.

My invention relates to improvements in nut-locks, the novelty of which consists in the construction and adaptation of parts for service, substantially as hereinafter described, and particularly pointed out in the claim.

The object of my invention is the provision of a nut-lock which will securely lock the nut on the bolt and prevent it from turning in consequence of the heavy strain of constant use, which will combine extreme simplicity of construction with strength and durability, thereby rendering the nut-lock cheap of manufacture.

In order that my invention may be more clearly understood and the advantages obtained by my peculiar construction appreciated, I have illustrated a nut-lock constructed in accordance with my invention in the accompanying drawings, in which—

Figure 2:
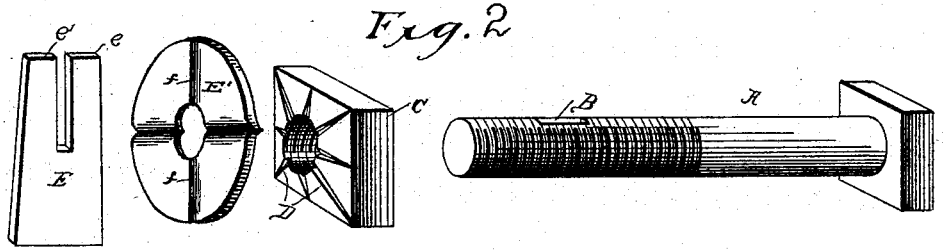
Figure 3:
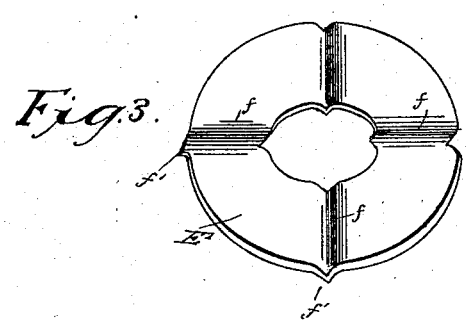
Figure 1:
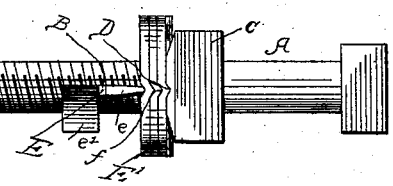

Figure 1 is a side elevation of my improved nut-lock. Fig. 2 is a view of the parts of the nut-lock in a detached condition, and Fig. 3 is a detail view of the washer.

Referring to the drawings, in which similar letters denote corresponding parts in all the figures thereof, A designates the bolt of my improved nut-lock, of the usual and well-known form, the said bolt being provided at a suitable point of its length with the extended transverse slot or opening B, the purpose of which will be presently explained.

C designates the nut, of any desired construction, which is provided on its upper or outer face with a series of radial cuts or grooves, D.

E designates the locking plate or bar, which is slightly tapered toward one end, and the said tapered end is bifurcated to provide the arms $e$ and $e'$. Said plate is formed of a thin piece of sheet metal and adapted to fit in the opening B of the bolt, and is prevented from passing entirely through the said opening by the larger end of the said plate being too wide for the length of the slot or opening.

E' is a thin sheet-metal washer, having radial grooves or indentations $f$ on the upper side stamped therein, and consequently forming corresponding radial bulges or ridges $f'$ on the other side. These ridges $f'$ are adapted to fit in the radial grooves in the face of the nut when the washer is laid on the nut, and the grooves or indentations on the face of the washer are adapted to receive the lower edge of the locking-plate.

In use the nut is screwed on the bolt in the usual manner. The washers are placed over the bolt with their ridges fitting in the radial grooves of the nut, and the locking-plate is inserted through the transverse slot in the bolt, with one edge resting in one of the radial grooves of the washer. To obviate all tendency of the locking-plate working loose and out of place the upper arm, $e'$, is bent laterally or out of the plane of the plate, thus preventing said plate effectually from becoming displaced.

The advantages of my nut-lock will be readily apparent. It is easily applied to all classes of work where nut-locks are required, and is especially adapted for use on railroads.

Having thus described my invention, what I claim, and desire to secure by Letters Patent of the United States, is—

In a nut-lock, the bolt having the opening or slot and carrying a nut having a series of radial grooves or cuts, and the lock-plate, combined with a washer having radial ridges to fit in the grooves in the nut, and corresponding radial grooves to be engaged by the said plate passed through the slot in the bolt, said washer being adapted to fill the space between the upper surface of the nut and the lower edge of the lock-plate, substantially as and for the purpose set forth.

In testimony that I claim the foregoing as my own I have hereto affixed my signature in presence of two witnesses.

LUTELLUS HUSSEY.

Witnesses:
WM. O. DALE,
GEORGE LINK.